(12) United States Patent
Raber

(10) Patent No.: US 8,381,890 B2
(45) Date of Patent: Feb. 26, 2013

(54) FRICTION CLUTCH HAVING A WEAR ADJUSTER

(75) Inventor: Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 350 days.

(21) Appl. No.: 12/660,342

(22) Filed: Feb. 23, 2010

(65) Prior Publication Data

US 2011/0056790 A1 Mar. 10, 2011

Related U.S. Application Data

(63) Continuation of application No. PCT/DE2008/001344, filed on Aug. 14, 2008.

(30) Foreign Application Priority Data

Aug. 23, 2007 (DE) .......................... 10 2007 039 857

(51) Int. Cl.
*F16D 13/75* (2006.01)
(52) U.S. Cl. .............................. 192/70.252; 192/111.18
(58) Field of Classification Search ............. 192/111.18, 192/111.3, 111.4, 111.5
See application file for complete search history.

(56) References Cited

U.S. PATENT DOCUMENTS

| 5,641,048 A | * | 6/1997 | von Gaisberg | 192/70.252 |
| 5,645,153 A | | 7/1997 | Weidinger | 192/70.252 |
| 5,690,203 A | * | 11/1997 | Link et al. | 192/70.252 |
| 5,887,689 A | * | 3/1999 | Young | 192/70.252 |
| 6,029,788 A | * | 2/2000 | Weidinger et al. | 192/70.252 |
| 6,109,413 A | * | 8/2000 | Young | 192/70.252 |
| 6,123,180 A | * | 9/2000 | Weidinger | 192/70.252 |
| 2004/0026206 A1 | * | 2/2004 | Lindner et al. | 192/70.25 |

FOREIGN PATENT DOCUMENTS

| DE | 44 36 109 C1 | 1/1996 |
| DE | 198 57 199 A1 | 6/1999 |
| GB | 2 336 411 A | 10/1999 |

* cited by examiner

*Primary Examiner* — Rodney Bonck
(74) *Attorney, Agent, or Firm* — Alfred J. Mangels (57) ABSTRACT

A friction clutch having a wear adjuster that compensates for wear in the form of an incorrect spacing between the pressure plate and the pressing plate as a result of an abrasion of the clutch friction linings. The incorrect spacing between the disk spring and the pressing plate is compensated by a ramp device. The ramp device and the pressing plate are coupled to one another by a positive connection, which, in order to compensate for the incorrect spacing, is temporarily suspended only when the incorrect spacing has been detected by a position sensor.

14 Claims, 9 Drawing Sheets

FRICTION CLUTCH HAVING A WEAR ADJUSTER

CROSS-REFERENCE TO RELATED APPLICATION

This application is a continuation of International Application Serial No. PCT/DE2008/001344, having an international filing date of Aug. 14, 2008, and designating the United States, the entire contents of which is hereby incorporated by reference to the same extent as if fully rewritten.

BACKGROUND OF THE INVENTION

1. Field of the Invention

The present invention relates to a friction clutch, with a wear adjuster, a pressing plate with non-rotatably arranged friction linings that can be pressed between a pressure plate and the pressing plate disposed axially in a limited manner, relative to the latter, whereby the spacing between the surfaces of the pressure plate and the pressing plate is determined in a loaded state by means of a position sensor, and incorrect spacing is compensated by means of a ramp device disposed between the contact surface and the pressing plate depending on the determined incorrect spacing.

2. Description of the Related Art

Friction clutches with appropriate wear adjustment are known. Thus, a displaceable pressing plate is generally provided between pressurizing media, for instance, a disk spring, for pressurizing an axially limited pressing plate relative to a pressure plate for clamping friction linings, and a ramp device that when friction linings are worn out, as is noticeable by an axially incorrect spacing between the pressure and pressing plates, such a ramp device compensates for the incorrect spacing by displacing the ramps relative to one another. So long as they should not be self-adjusted, a ramp device and counter ramps are fixed against the effect of axial forces that can be provided by appropriate energy accumulators via frictional means, against rotation in the circumferential direction. Should a so-called position or wear sensor detect incorrect spacing, frictional effect will be removed and the ramp device, mostly supported by a spring device, will be rotated so long until the ramps and counterpart ramps will have compensated the wear and frictional contact reestablished to fix the ramps onto one another.

An object of the present invention is to improve such friction clutches having wear adjustment. Thereby, simplifications of wear adjustment, increasing the reliability, and/or reduction of the number of components are particularly in the forefront.

SUMMARY OF THE INVENTION

The object is met by a friction clutch with wear adjustment, with friction lining between a pressure plate and a pressing plate, limited axially relative to the latter, with non-rotatable and spring-loaded connection to the latter in the closing direction of the friction clutch, disposed such that it can be pressurized with a lever-type clamping device on the pressing plate, with a contact surface, a position sensor for determining the spacing between the surfaces of the pressure plate and pressing plate in the pressurized state, a ramp device disposed between the contact surface and the pressing plate for compensating incorrect spacing acquired by the position sensor, wherein the incorrect spacing in the pressurized state of the friction linings is determined, and in the relaxed state of the friction linings the latter incorrect spacing is compensated, and the ramp device and pressing plate are connected in a form lock-up manner with one another, and the form lock-up is released in the presence of incorrect spacing.

Thus, the lever-shaped clamping device can be a disk spring with disk spring tongues aligned radially inwards, pressurized by a release system that loads the preloading plate against the pressure plate, radially outwards, and supports itself radially within a component connected non-rotatably with the pressure plate and pressing plate.

Further development of the friction clutch can thereby, be pressed, in that the friction clutch that is closed in the released state is pressed open or the friction clutch that is open in the released state is pressed closed. Alternatively to this, the friction clutch can be pulled, in that the lever-type clamping device pulls the friction clutch open in the closed state or pulls it closed in the open state. Two such friction clutches can be combined in a housing to a so-called dual clutch, wherein at least one of the friction clutches features a wear adjuster in the proposed manner, and both friction clutches are preferably forcefully closed friction clutches.

The ramp device can be formed advantageously by a ring part with ramps rising in the circumferential direction, distributed over the circumference, which interact with correspondingly formed counterpart ramps on the pressing plate. Thereby, the ring part can be spring-loaded in the circumferential direction, for instance a tension spring can be hang hung in the pressing plate and be interlocked with the ring part. In other forms of the ramp device, segments comprising individual ramps or several ramps can be provided, which are accordingly pressurized by energy accumulators such that they are displaced when wear adjustment is initiated. In an advantageous manner, a ramp ring can be pressurized by an energy accumulator that is interlocked between the pressing plate and the ramp ring, and prior to every wear adjustment process, for instance, preloaded by tensioning the bulge of the energy accumulator formed as a leaf spring fixed on both sides against clutch housing or a similar axially fixed component, when the friction clutch is opened. In this manner, the entire energy that is required for rotating the ramp ring over the entire service life of the friction clutch does not need to be stored in the energy accumulator.

The form lock-up between the pressing plate and ramp device can be formed by teeth consisting of two tooth segments meshing with one another. Under tooth segment in its most general form, one understands a mechanical form that, together with a corresponding form on the other tooth segment, forms a lock-up in the manner that a longitudinal motion of both tooth segments relative to one another can only occur when the latter, as a result of a determined requirement for wear adjustment by the position sensor, for instance in the event of incorrect spacing, should be moved apart, for instance, the formations are swiveled apart, thus, at least a formation along its spatial extension is moved away from the action range of the other formations and additionally or alternatively the formations are separated from one another perpendicularly to their extension. In an advantageous manner, the tooth segments follow the circumferences of the friction device, which can be annular in shape so that the tooth segments are circular-arc-shaped, wherein a tooth segment features an external tooth and the corresponding tooth segment features an internal tooth. When the friction clutch is not in a state of wear adjustment of wear, both tooth segments form the form lock-up between the pressing plate and ramp device, so that no displacement or rotation of both parts relative to one another can occur. Particularly, with rotational irregularities of internal-combustion engines and relative accelerations in both directions of rotation that result from them, undesired wear adjustment can be avoided. Thereby, one of the tooth segments can be assigned to the position sensor and the other tooth segment can be connected rigidly with the ramp device. In this case, the tooth segment assigned to the position sensor will be raised by the position sensor, which means, it will be displaced axially, whereas the tooth segment assigned to the ramp device, for instance, a ramp ring, is axially fixed. In dependence upon the wear of the friction clutch, or upon the friction linings disposed on the clutch disk, the position sensor, which in the closed state has a contact to the pressure plate and hence always taps the spacing between the pressure plate and pressing plate, covers different axial distances, which leads to an axial displacement of the tooth segment assigned to it.

Should wear adjustment take place, the form lock-up of the tooth in the presence of incorrect spacing, which can be predetermined by the position sensor setting, will be cancelled preferably by axially displacing the tooth segment, so that the pressing plate and ramp device are rotatable relative to one another. Thereby, the profile swiveled out of the profile, for instance, teeth of the one tooth segment can be spring-loaded in the swiveling direction, so that it comes to rest with preload on the other profile, until the wear adjustment process is terminated. Preloading can be occur by means of a spring-loaded position sensor, in which case, a tension spring can pull the position sensor with one end on the pressure plate, whereas in the area of the other opposite end, for instance, a pin-shaped position sensor, the axially displaceable tooth segment is axially accommodated or fixed. In a further embodiment, the tooth segment can be interlocked with the pressing plate.

If the form lock-up between the ramp device and pressing plate is released because of incorrect spacing between the pressure plate and pressing plate, for instance as a result of wear of the clutch linings, displacement of the ramp device or rotation of the ramp ring relative to the pressing plate will be carried out to reduce incorrect spacing only when the pressing force acting on the ramp device and pressing plate of the leaf spring attached between the clutch housing and pressing plate for restoring the pressing plate during the opening of friction clutch causes a smaller frictional force between the ramp of the ramp device and the pressing plate than the initial force of the energy accumulator for rotating the ramp device. Wear adjustment of the ramp device does not occur therefore with the opening of the friction clutch but rather when the leaf springs are nearly without force, thus, when the friction clutch is nearly opened. A corresponding wear adjustment release point results from the dimension of the leaf springs and the energy accumulator for displacing the ramp device. Thereby, it is advantageous when rotation of ramp device occurs in a limited manner. This means that the angle about which the ramp device rotates relative to the pressing plate is prescribed. This can occur in that during wear adjustment axially above the other tooth segment under preload in case of the use of teeth during rotation around a tooth, the latter immediately snaps in the other tooth segment and forms the form lock-up again.

To prevent unintentional spring-back into the same tooth gap during rotation of the ramp device, and hence to prevent a new form lock-up without compensation of incorrect spacing, a tooth segment will be formed and be limited and displaceable against the effect of an energy accumulator, preferably at an angle of half a tooth. For this purpose, the energy accumulator is preloaded prior to sensing incorrect spacing up to a limit stop in the rotating direction of the ramp device. As soon as the sensor detects incorrect spacing, the axially displaceable tooth segment is raised from the teeth and the limited, displaceable tooth segment is displaced by relieving the preloaded energy accumulator against the rotation direction of the ramp device, preferably up to a tooth-on-tooth position, in which the teeth of both tooth segments overlap. It is obvious that both functions—axially displaceable function and limited, rotatable function—in the direction of rotation can be realized in one tooth segment, and a component for axially clamping the respective tooth segment on the position sensor and for limited displacement of the tooth segment can be integrated in the tooth segment, wherein the energy accumulator can be formed as a leaf spring, which can be bulged by preloading compression. Limited displacement can be introduced in the pressing plate by means of pins, screws, or rivets, which are placed in slots that feature openings in the circumferential direction, corresponding to the desired displacement.

Through the axially overlapping tooth-on-tooth position, which is assumed directly after sensing incorrect spacing for a fully engaged friction clutch, the desire for wear adjustment is stored until the friction clutch is opened again and the leaf springs between clutch housing or an axially fixed component assigned to the latter or to the pressure plate come into force equilibrium with the tension spring of the ramp device. Upon attaining this force equilibrium, the ramp unit is displaced, and after a displacement at the height of an angle of overlap of teeth of both tooth segments the tooth segment under preload snaps in axially under the formation of teeth and form lock-up again in the axially stationary tooth segment. In a further step, both tooth segments are taken by a further angle at the height of a half tooth of the teeth and thereby the energy accumulator is again preloaded for limited displacement of the tooth segment. The slope of the ramps on the ramp device and of the corresponding ramps in the pressing plate, the interval of the teeth of both tooth segments, as well as the wear areas of the friction linings, are matched to one another such that over the service life of the friction clutch or of the friction linings a reasonable number of adjustments with constant disengagement forces can be provided within a wear adjustment interval. It has appeared that approx. 40-60 adjustments are advantageous.

To improve the resolution of wear adjustment for friction clutches as described earlier, the tooth segment assigned to the position sensor can be divided by two, wherein each individual part is activated by the position sensor separately and independently of the other part. The teeth or profile of both parts are offset relative to one another by half a tooth in the circumferential direction, so that the teeth of one part constantly form a form lock-up with the teeth of the other part, whereas the teeth of the other part form a tooth-on-tooth position axially on the teeth of the tooth segment disposed axially in a fixed manner. When incorrect spacing is detected by the position sensor, it pushes the second part of the teeth out of the teeth forming the form lock-up. In this way, the tooth segment can be connected advantageously with the ramp device in this exemplary embodiment since in the other case, at the same time, both parts of the tooth segment pressurized by the position sensor would have to be displaced, under the effect of the preloaded energy accumulator, against the direction of rotation of the ramp device, rotated by half a tooth and the teeth of the first part forming the tooth-on-tooth position will also be displaced by half a tooth, but still remain in the same axial position, since they still overlap at the height of half a tooth with the teeth of the other tooth segment. This state is stored until the friction clutch is released, and with decreasing strain of the ramp device and pressing plate by the leaf springs the ramp device will be rotated by half a tooth up to a limit stop against the pressing plate, and in the process the energy accumulator will be preloaded again by the energy accumulator to rotate the ramp device. Through rotation, the teeth of the part initially lying on the tooth segment will be pulled into the teeth and the teeth of the part forming the teeth before the wear adjustment remain axially above the corresponding tooth segment in a tooth-on-tooth position up to the next adjustment. Thus, for instance, the preset resolution of incorrect spacing of approx. 0.1 mm will be halved for an undivided tooth segment.

By changing the location of the limit stops, control can be changed advantageously so that an adaptation of the tooth segments to the adjusted state of the friction clutch already occurs, and hence a form lock-up by accounting for the wear adjustment angle already in the still strained state of the pressing plate and ramp device, so that upon releasing the strain the form lock-up for the adjusted state is already set. With this, for instance, during an axial displacement of the position sensor as a result of an incorrect spacing, the part of the tooth segment assigned to the position sensor lying in the teeth will be raised from the teeth, through which the tooth segment preloaded in the circumferential direction under relief of the strain until the other part snaps in the tooth segment assigned to the position sensor in which the rotating tooth segment rotates. The state of a stress-relieved energy accumulator then prevails on the tooth segment assigned to the ramp device; the two parts of tooth segment assigned to the position sensor have exchanged their positions, the initially toothed part lies on the teeth and the initially non-toothed part lies in the teeth of the tooth segment assigned to the ramp device. In overall, both tooth segments are rotated by half a tooth relative to one another and in form lock-up with one another. When opening the friction clutch and relieving the pressing plate and ramp device, the latter are rotated relative to one another by tensioning the energy accumulator that is active in the rotational direction on the tooth segment of the ramp device up to a limit stop by a rotation angle that corresponds to half a tooth of the teeth of the tooth segment.

In the previously described exemplary embodiments, the energy for rotating the ramp device and for pressurizing the energy accumulator for the limited displacement of a tooth segment was derived preferably separately from energy accumulators designed as tension springs, whose capacity is dimensioned for service life. In an advantageous manner, an energy accumulator can be provided, which prior to every wear adjustment process is pressurized to an extent that is sufficient for a rotation to the extent of the angle to be adjusted and for pressurizing the energy accumulator for the displacement of the tooth segment. For this purpose, an energy accumulator can be provided, which is supported between a contact surface of the ramp device and a displaceable tooth segment connected with the ramp device that is axially limited against the effect of the energy accumulator pressurized by a leaf spring. Preload occurs from the leaf spring that in the closed state of the friction clutch is interlocked between the clutch housing and the pressing plate, which during the opening of the friction clutch preload the energy accumulator against an axially fixed component like the clutch housing. For instance, the energy accumulator can be a bulged leaf spring supported by means of their ends on said contact surface, which is preloaded on a contact surface, which is integrated or provided in the pressure plate, the clutch housing, or on a component connected with the latter.

BRIEF DESCRIPTION OF THE DRAWINGS

The invention is explained in detail using FIGS. 1 to 15. The figures show the following.

DESCRIPTION OF THE PREFERRED EMBODIMENTS

Figure 1:
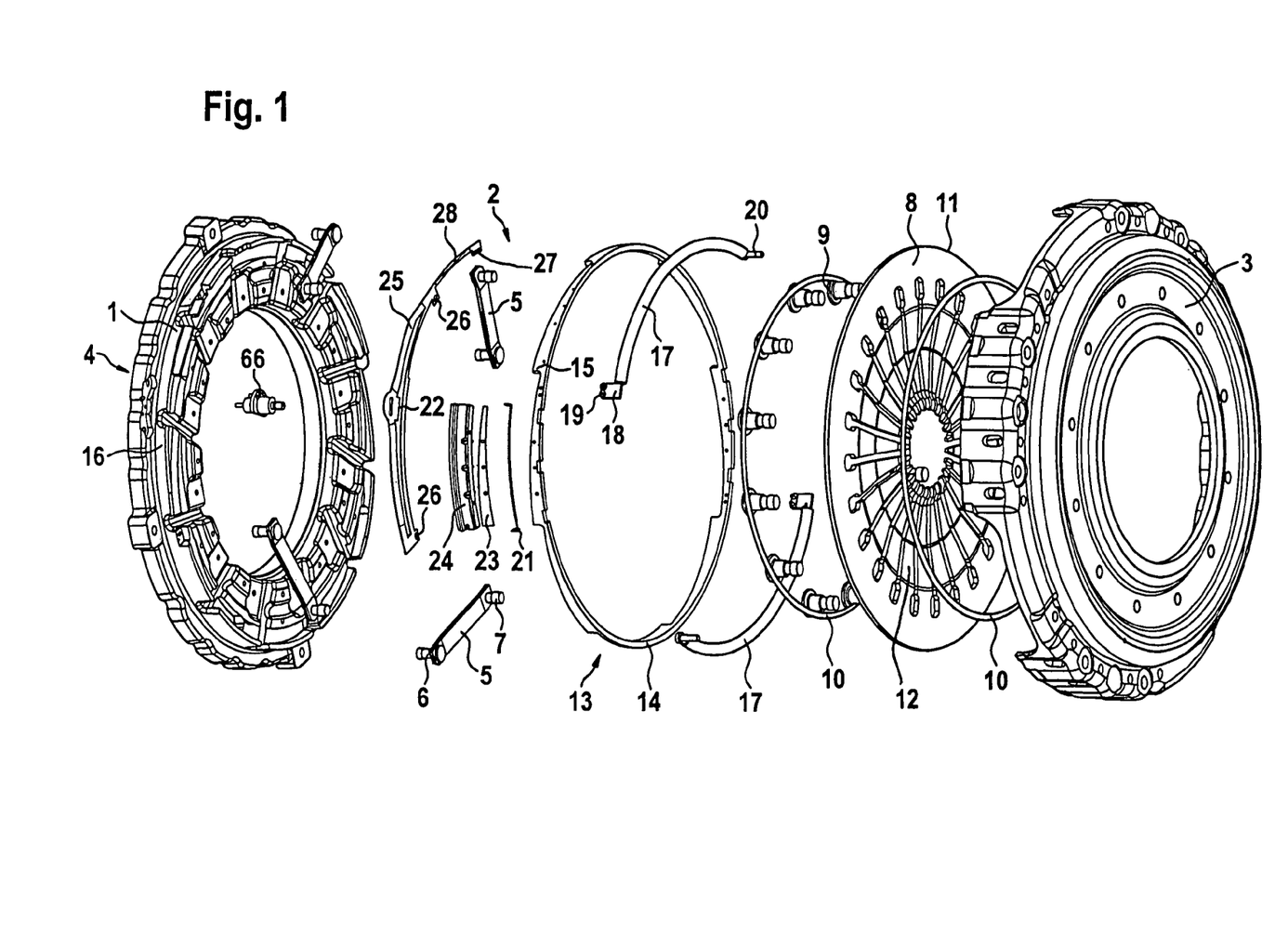
FIG. 1 shows an exploded drawing of an exemplary embodiment of clutch housings with pressing plate and wear adjustment of a friction clutch.

FIG. 1 shows an exploded drawing of a pressing plate 1, a wear adjuster 2 and clutch housing 3. The parts complementing the friction clutch, the pressure plate and the clutch disk with the friction linings and lining springs disposed in between are omitted for clarity. The pressure plate adjoins axially on the friction surface 4 of the pressing plate 1, wherein the clutch disk lies axially between the friction surface 4 and the pressure plate, which can be provided in a flywheel of a single mass flywheel, or on the secondary side of a dual-mass flywheel, or a disk part disposed with the drive shaft of a drive unit. The clutch housing 3 is axially fixed with the pressure plate and it accommodates the pressing plate 1 radially inside. The pressing plate 1 is connected non-rotatably and in an axially displaceable manner by means of the leaf spring 5 with the clutch housing 3 by means of riveting or bolt 6, 7, which are fastened respectively in the associated openings in the pressing plate 1 and inside the clutch housing 3. The preload of the leaf spring 5 is thereby set such that the pressing plate 1 in the opened state of the friction clutch is spaced from the friction linings of the clutch disk. For a closing friction clutch, contrary to the effect of the lining springs of the clutch disk, the friction linings of the clutch disk are interlocked with the friction surface of the pressure plate. The motion of the pressing plate 1 is thereby effected by the disk spring 8, which is fastened by means of the riveting 9 by interposing front and rear side wire rings 10 on the clutch housing 3. The disk spring 8 is formed as a two-arm lever, with a ring-shaped lever surface on the diameter of the wire rings 10, and pressurizes the pressing plate 1 with its external force edge 11 in a manner that in the equilibrium state a closed state of the friction clutch results when the cushion deflection is compressed. When the disk spring tongues 12 protruding inwards are activated by a release system operated by the driver by means of a clutch pedal, or activated by an automated clutch actuator axially in the direction of the pressing plate 1, then the friction clutch will be opened against the effect of the spring 8 with its typical force characteristic over the distance and under the support of the cushion deflection and under preload relief of the leaf spring 5.

The friction linings of the clutch disk are subject to wear and possibly settling losses, which is expressed in the reduction of the spacing between pressure plate and pressing plate 1, and which in uncompensated cases result in erection of the disk spring tongues 12, which causes changed force ratios and results in increased release forces. To compensate for the loss of axial spacing, incorrect spacing caused by wear will be compensated by wear adjuster 2. This is formed by a ramp device 13, which in the illustrated exemplary embodiment is a ramp ring 14 with ramps 15 distributed over its circumference. The ramp ring 14 comes axially in contact on the counterpart ramps 16 accordingly provided, for instance embossed or machined inside the pressing plate 1. On its opposite side the ramp ring 14 comes in contact with the disk spring 8. The ramp ring 14 is spring-loaded in the circumferential direction in order to compensate for incorrect spacing by rotating the ramp rings 14 on the counterpart ramps 16. In the illustrated exemplary embodiment two tension springs 17 are used, which are supported on a diameter of the clutch housing 3 and are fastened to an end 18 with the ramp ring 14 by means of riveting 19 or a similar fastening means, and are fastened at the other end to the clutch housing 3 by means of the riveting 20 or a similar fastening means. Since the clutch housing 3 and the pressing plate 1 feature the same sense of rotation and in general are rigidly connected with one another, fastening of tension springs 17 is possible on both parts. The tension springs 17 are preloaded such that their preload is sufficient for rotating the ramp rings 14 over the entire wear range.

To avoid uncontrolled adjustment, the wear adjuster 2 requires a control device. During the closed and hence states of the friction clutch stressed by the disk spring 8, wear adjustments as a result of intense friction of the ramps 15 and counterpart ramps 16 are possible in any case under high differential accelerations resulting from rotational irregularities of the drive unit. With an opening friction clutch, the strain decreases since only the recoil force of the leaf springs 5 between clutch housing 3 and pressing plate 1 causes strain in the ramps 15 and counterpart ramps 16. In the fully opened state of the friction clutch, the straining forces decrease further. In order to be more or less independent of the friction forces probably changing over the service life when controlling adjustment, the ramp device 13 and the pressing plate 1 are fixed by means of a form lock-up with regard to rotation relative to one another, so long as wear adjustment is not required. For this, tooth segments 21, 22 provided on the ramp ring 14 and on the pressing plate, which form a toothed engagement with one another. The tooth segment 21 is manufactured out of hardened material and is received by means of mounting part 23 and spacer 24 on the ramp ring 14. The tooth segment 22 assigned to the pressing plate 1 in the exemplary embodiment is accommodated in a control part 25 as a single part. The control part 25 is accommodated on the pressing plate 1 by means of slotted holes 26, limiting displacement in the circumferential direction. The opening 27 fixes the control part 25 without clearance. The result is that the elastically provided area between the opening 27 and the adjacent slot 26 during the displacement of the control part 25 is bulged and hence loads the control part 25 in the relief direction, and thus has the function of an energy accumulator 28 in the form of a leaf spring. It is obvious that this function can be fulfilled advantageously also through separately disposed spring devices like coil springs, tension springs, or the like. The tooth segment 22 is furthermore formed axially elastic in contrast to the pressing plate. To satisfy the functions of the control part 25, spring steel is therefore used preferably, wherein the teeth of the tooth segment 22 are preferably hardened.

In order to initiate a wear adjustment process, the form lock-up of the two tooth segments 21, 22 must be detached. This occurs by displacing the axially elastic tooth segment 22, hung on the control part 25, in the direction of disk spring 8, from the toothed arrangement outwards so that the tooth segment 22 comes to lie over the tooth segment 21. This axial displacement by the position sensor 66, which covers the spacing between the pressure plate and the pressing plate 1 and upon falling short of preset spacing, causes a displacement of the tooth segment 22 above the tooth segment 21.

Figure 2:
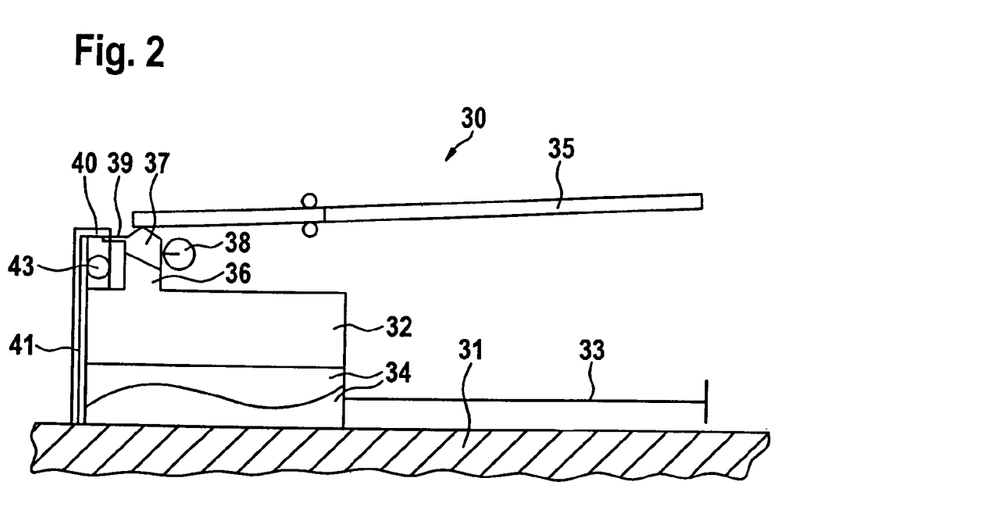
FIGS. 2 to 11 show a schematic depiction of the systematic function in section and in development.
Figure 3:
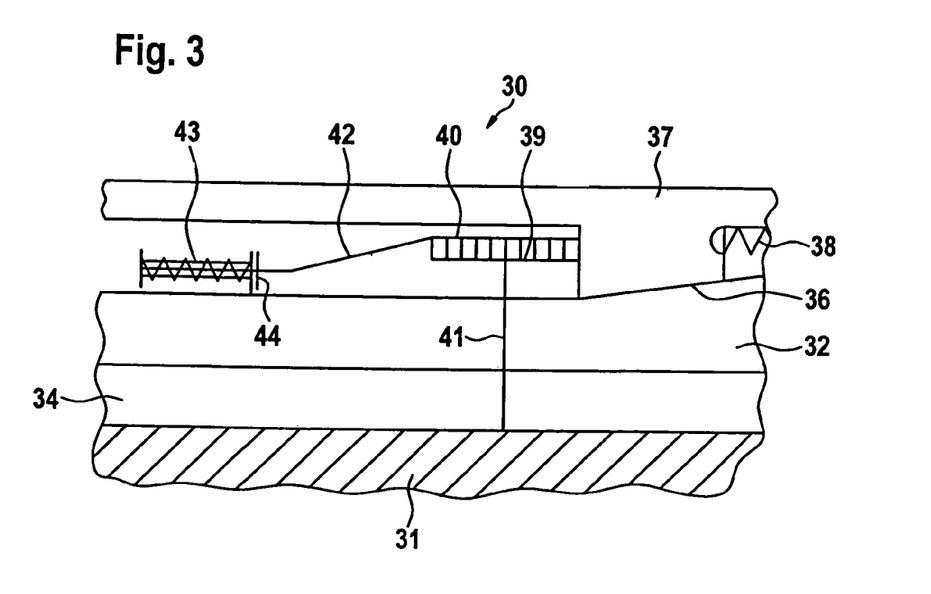

The function of wear adjuster 2 is illustrated schematically in the following passage based on FIGS. 2 to 11 in different functional states. FIG. 2 in section and FIG. 3 show a closed friction clutch 30 as development with pressure plate 31, pressing plate 32, and clutch disk 33 with friction linings 34 and cushion deflection and a disk spring 35 without wear. The pressing plate 32 features counterpart ramps 36, which are in contact with the ramp device 37. The ramp device 37 is biased by energy accumulators 38 in the direction of rotation. A tooth segment 39 is axially disposed on the ramp device and fixed in the circumferential direction. The tooth segment 40 assigned to the pressing plate 32 is connected with the position sensor 41 and follows its axial position with regard to the pressing plate 32, which on the other hand, from the position of the pressing plate 32, is placed opposite the pressure plate 31, since the position sensor 41 is positioned on the pressure plate 31 and fastened in an axially displaceable manner on the pressing plate 32. The tooth segment 39 is integrated in—not shown—the control part 42 that is preloaded against the slope of the ramps 36 by means of the energy accumulator 43. In the state without wear, the axial location of the tooth segment 40 is set opposite the tooth segment 39 such that the tooth arrangement and hence a form lock-up is still ensured so that preload of energy accumulator 43 is supported by the teeth and no relief of the limit stop occurs.

Figure 4:
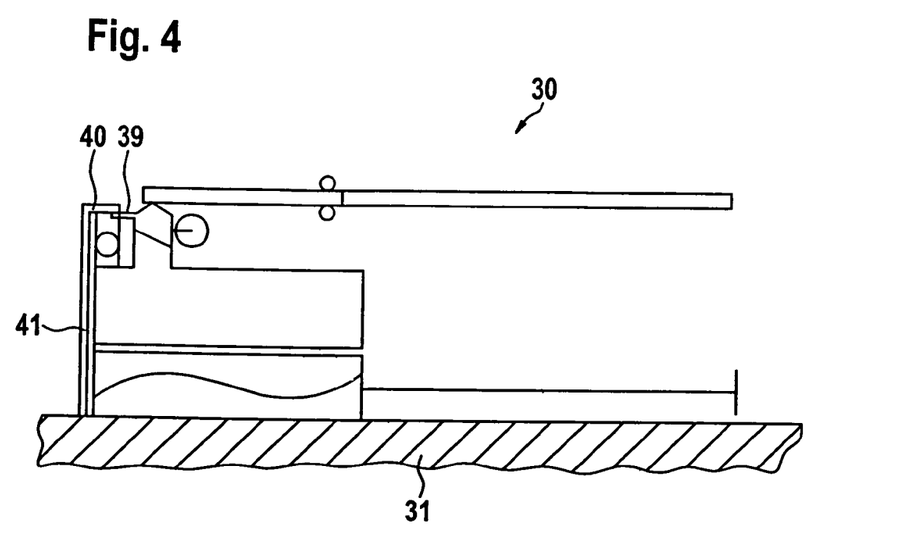
Figure 5:
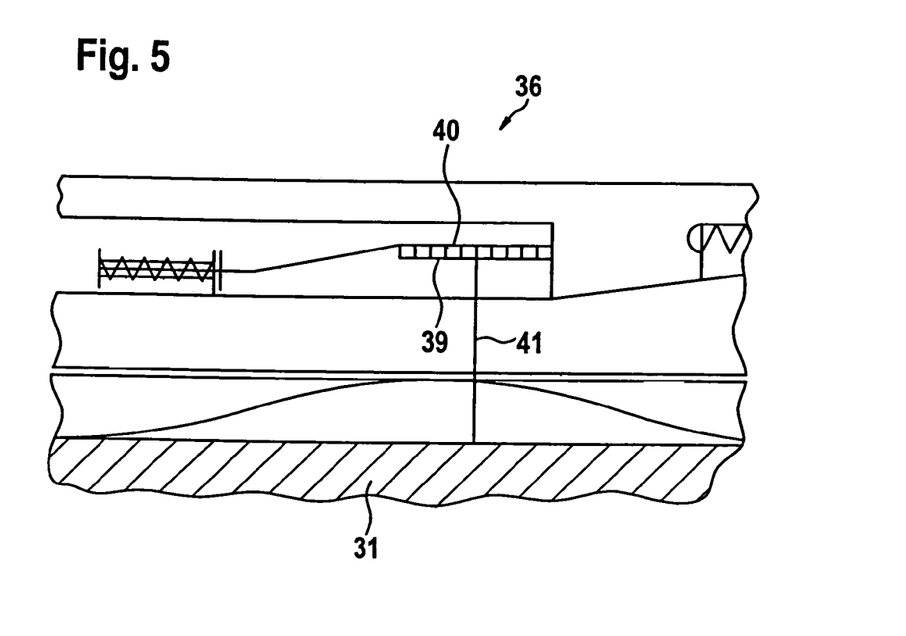

FIGS. 4 and 5 show a state in which the friction clutch 30 starts to open. The position sensor 41 is spring-loaded opposite the pressing plate 32, displaces itself against the motion of the pressing plate 32, and remains therefore in this functional state in contact with the pressure plate 31. Therefore, the tooth segment 40 that is axially coupled to the position sensor 41 dips deeper into the tooth segment 39.

Figure 6:
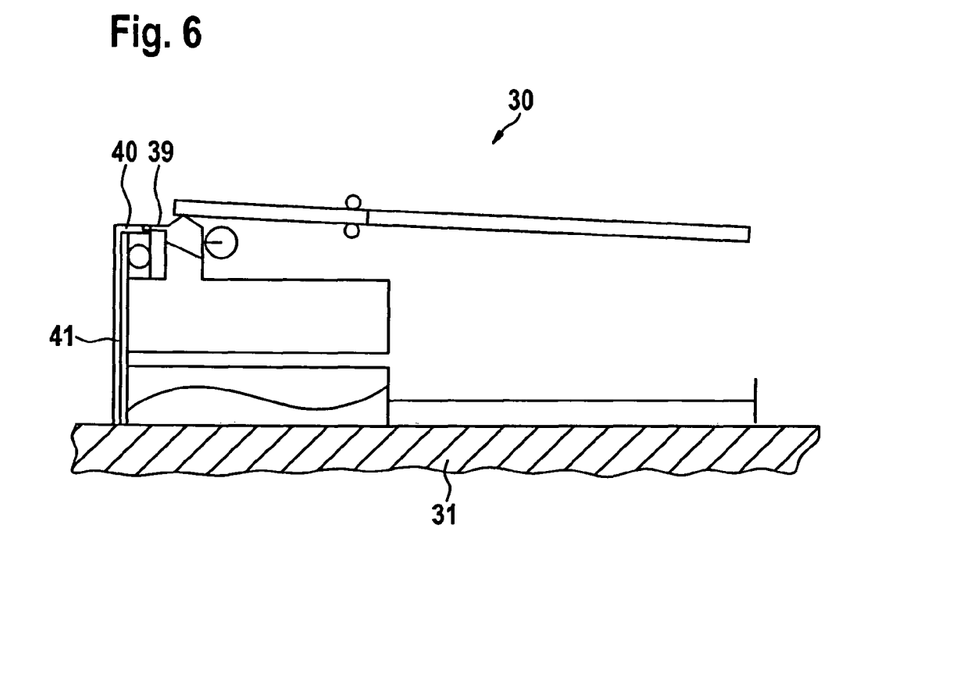
Figure 7:
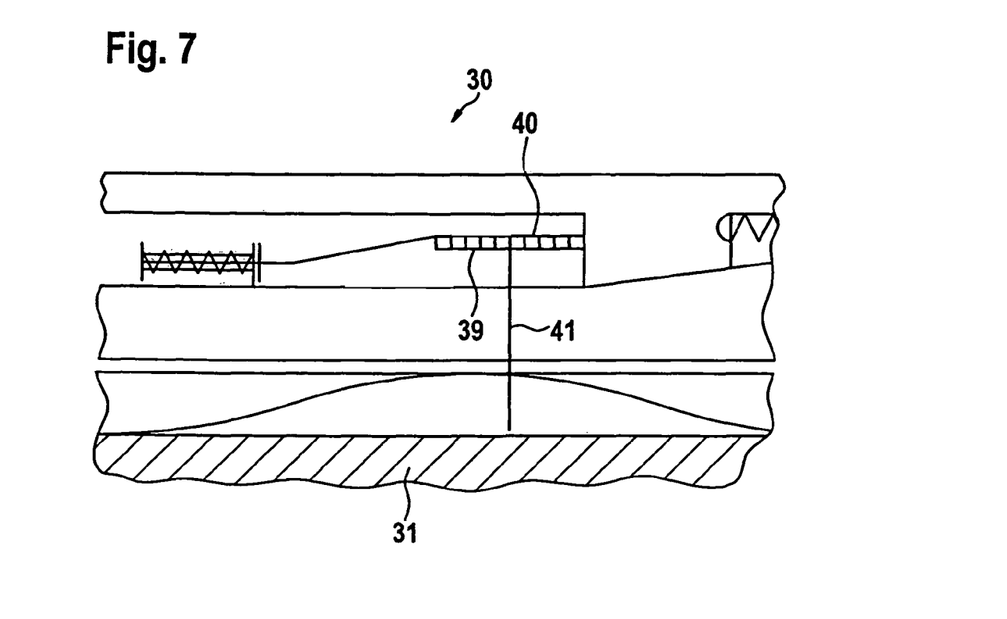

FIGS. 6 and 7 show the state of non-adjusting friction clutch 30 in a fully opened state. The position sensor 41 has lifted up from the pressure plate 31. The form lock-up between both tooth segments 39, 40 is retained.

Figure 8:
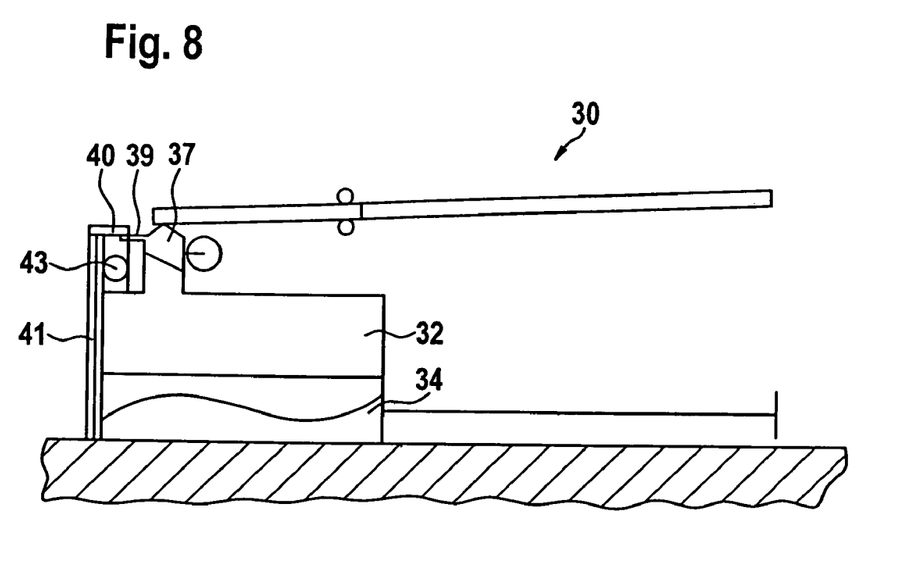
Figure 9:
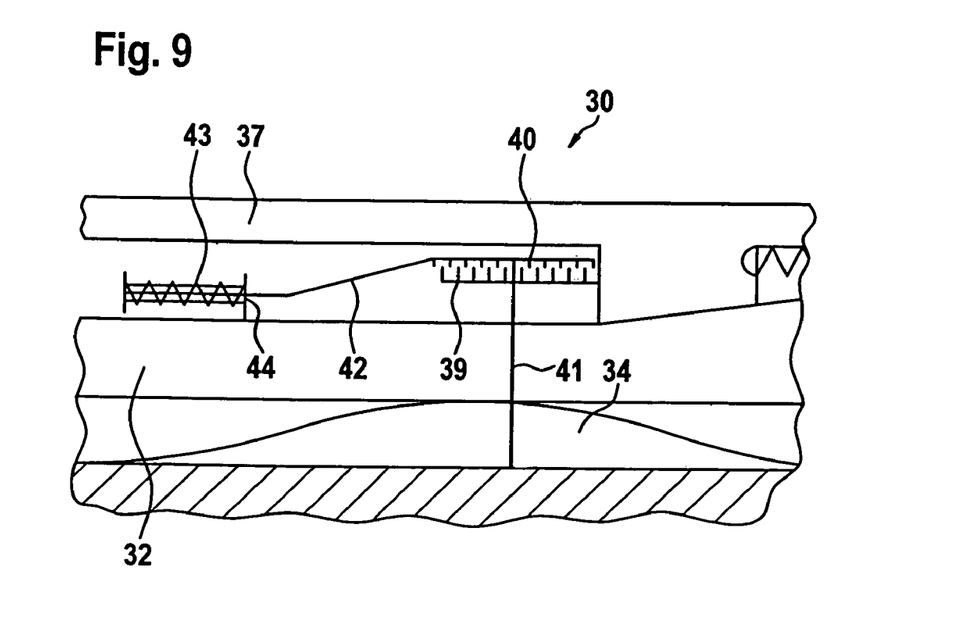

FIGS. 8 and 9 show a closed friction clutch 30 in a worn out state. The pressing plate 32 is positioned nearer to the pressure plate 31 because of diminishing thickness of friction linings 34 when the friction clutch 30 is closed. As a consequence, the position sensor 41 is continuously constant in length and touches the pressure plate 31, and stands above its position opposite the pressing plate 32 without wear, above the latter, and displaces the tooth segment 40 from the toothed connection with the tooth segment 39. Since the counteracting force of the teeth is missing, preload of the control part 42 is decreased and it is displaced against the direction of rotation of the ramp device 37 to the limit stop 44, so that the teeth of the tooth segments 39, 40 come axially onto one another in a tooth-on-tooth position. In this manner, the reversal of form lock-up is independent of the position of the position sensor 41, so that when opening the friction clutch 30 the tooth segment 40 can no longer form a form lock-up with the tooth segment 39, but is rather held by the energy accumulator 43 in its rotational position on the limit stop 44.

Figure 10:
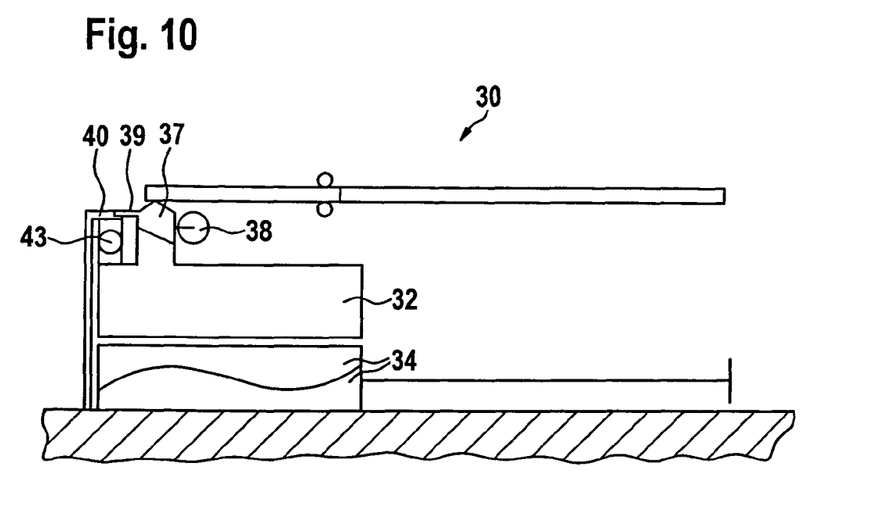
Figure 11:
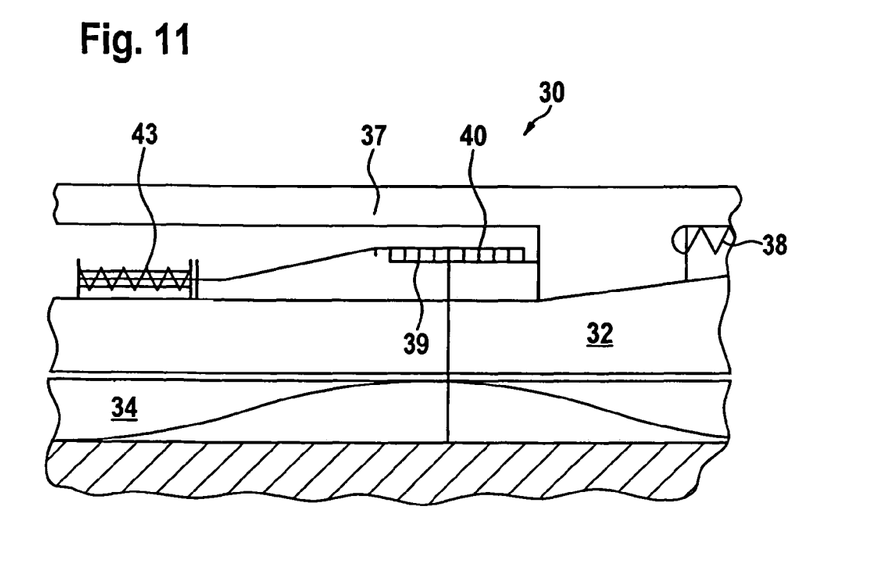

FIGS. 10 and 11 show the wear adjuster on an opened friction clutch 30. When the friction clutch 30 begins to open the strain in a reversed form lock-up between the ramps of the pressing plate 32 and the ramp device 37, which after the lifting of pressing plate 32 from the friction linings 34 and their cushion deflection is only sustained by the leaf springs between the clutch cover and the pressing plate 32, is further diminished until the stress developed by the energy accumulator 38 reaches the breakaway force of the ramp device 37. The ramp device 37 is rotated along the counterpart ramps 36 until the tooth segment 40 again snaps into the tooth segment 39. The tooth segment 40 is axially interlocked hereto, for instance by means of a tension spring that is integrated in the position sensor 41. During the rotary motion of the ramp device 37 the energy accumulator 43 is compressed so far, that is, preloaded, until it attains its original preload. Through the self-adjusting process, the original spacing between the pressing plate 32 and the pressure plate 31 is re-established, and the tooth segment 39 has rotated by one tooth relative to the tooth segment 40, which is again at the same point as before the wear adjustment. With regard to its extension in the circumferential direction, the tooth segment 39 has reached the maximum number of wear adjustments of wear, normally 40 to 80, which with a stroke of a wear adjustment of approx. 0.1 mm corresponds to a wear range of friction linings of 4 to 8 mm. It is obvious that the ramp slopes of the pressing plate 32 and the ramp device 37, as well as the width of teeth of tooth segments 39, 40, are matched to the default wear range.

Figure 12:
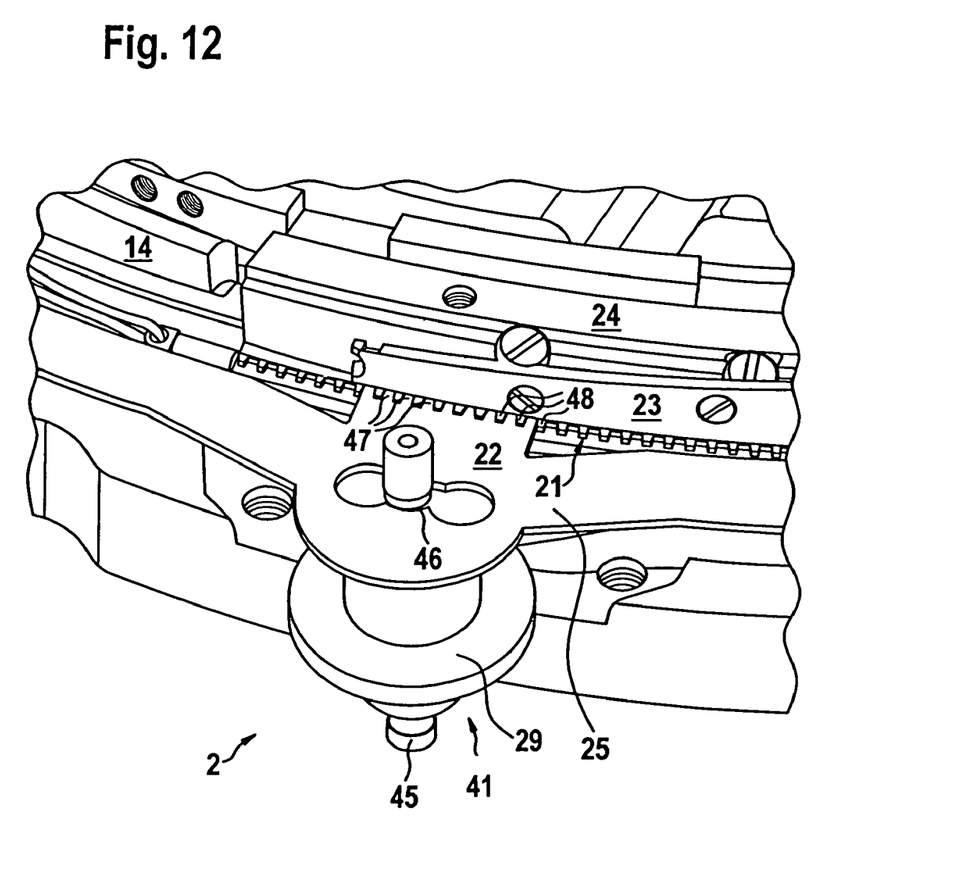
FIG. 12 shows a detail of FIG. 1.

FIG. 12 shows a near-reality detail of the wear adjuster 2 from FIG. 1 with a control part 25 depicted as a sectional in which the position sensor 41 is accommodated. The position sensor 41 is connected with a sensor housing 29 firmly with the pressing plate 1. The sensor housing 29 includes the sensor pin 45, which contacts the pressure plate on its one end and features a groove 46 on its other end, in which the control part 25 engages such that an axial capture occurs. At the same time during wear adjustment, displacement of the control parts can occur relative to the position sensor 41, to a limited extent. The pin 45 is spring-loaded against the sensor housing 29 in the axial direction, so that the control part 25 is preloaded axially towards the pressing plate. With this, an energy accumulator can be disposed inside the sensor housing 29. Alternatively or additionally, the control part 25 can be axially preloaded.

The control part 25 features a part on which the tooth segment 22 is provided as a single piece. The teeth 47 of the tooth segment 22 depends on the condition of wear, each forms a toothed engagement with the opposite teeth 48 of the tooth segment 21, wherein after every wear adjustment, the tooth segment 21 advances further by one tooth 48 to the tooth segment 22, until finally the wear limit of the friction clutch or friction linings of the clutch disk is attained. The tooth segment 21 in the illustrated exemplary embodiment is formed as a hardened insert that is accommodated by means of mounting parts 23, 24 on the ramp ring 14.

Figure 13:
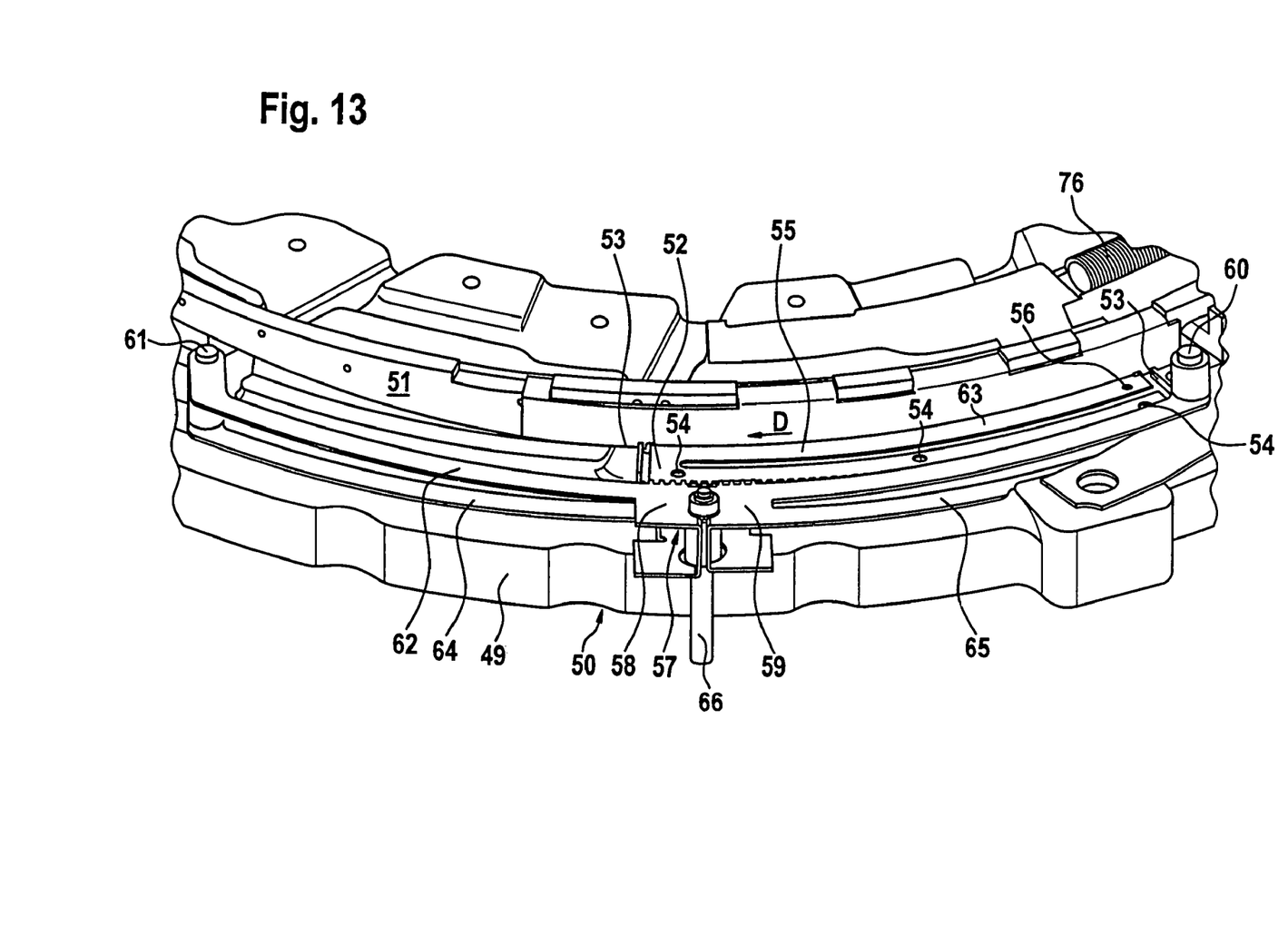
FIG. 13 shows an alternative exemplary embodiment with a two-part tooth segment.

FIG. 13 shows an alternative embodiment of a pressing plate 49 with a wear adjuster 50, in which the tooth segment 52 assigned to the ramp device 51 in the area of receptacles 53 in the circumferential direction, can be displaced in a limited manner, in that the tooth segment 52 slides on a support surface rigidly connected with the ramp device 51, and in the latter pins, rivets, or screws are fixed, which interlock in slots 54 provided in the tooth segment 52 pointing in the circumferential direction. The tooth segment 52 is interlocked between the pressing plate 49 and the ramp device 51 during form lock-up by means of an energy accumulator against the direction of rotation D of the ramp device 51. In the illustrated exemplary embodiment, the tooth segment 52 is combined with an energy accumulator 55 in the form of a leaf spring, which is rigidly connected on one side with its support and on the other, open side it is connected by means of a fastening means 56 through the slot of the energy accumulator 55, for instance a screw, rivet, or pin. During rotation of ramp device 51 in the direction of rotation D the energy accumulator 55 is captured by the fastening means, at the same time it is fixed by the teeth of tooth segment 52 with the tooth segment 57 on the other end and thus bulged and preloaded. Upon reversal of the form lock-up between the ramp device 51 and pressing plate 49, the stress is decreased, in that the tooth segment 52 is displaced in the direction of rotation D. Thereby, the limit stop can act in a limiting manner on the slots 54 or a new formation of form lockup for the rotary motion.

The form lock-up between the ramp device 51 and pressing plate is formed on the side of the pressing plate by a tooth segment 57 divided into two with the segment parts 58, 59, which are respectively rigid and not connected rotatably against the pressing plate 49. To support the tension and shearing forces, for instance, under relative accelerations of the drive unit, the segment parts 58, 59 are respectively supported in both directions with upper support arms 62, 63 and lower support arms 64, 65 on supports 60, 61, which are rigidly connected with the pressing plate 49. Segment parts 58, 59 are thus supported axially in an elastic but non-rotatable manner, and are hinged independently of one another axially by the position sensor 66.

Figure 14:
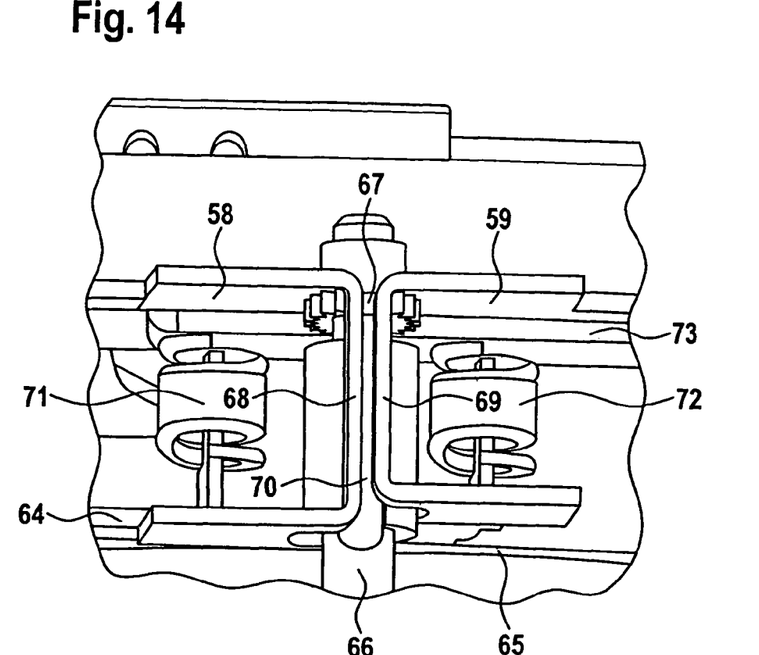
FIG. 14 shows a detail of FIG. 13 in a changed perspective.

FIG. 14 shows a detail of the arrangement of the position sensor 66 shown in FIG. 13 in bottom view. The position sensor 66 features a radially extended collar 67, on which both segment parts are axially supported. In the illustrated exemplary embodiment, the collar 67 is attached to a separate part connected with the position sensor 66, for instance, a nut disposed on a thread of the position sensor 66, so that the collar 67 is adjustable relative to the position sensor 66 and can be fixed by means of the external teeth of the collar 67 for the desired setting position. The two segment parts 58, 59, respectively, form an end piece 68, 69 of different length, so that the lower support arms 64, 65 can be routed axially over one another. The two end pieces 68, 69 can be routed in a groove 70 integrated in the position sensor 66. In a special exemplary embodiment, the guide in the groove 70 is of low-friction, so that for a corresponding axially displaceable fastening of the position sensor 66 in the pressing plate 49, the support arms 62, 63, 64, 65 can be omitted.

The two segment parts 58, 59 are individually, interlocked axially respectively against the collar 67. In the illustrated exemplary embodiment, coil springs 71, 72 hang on the basis of the lower support arms 64, 65 and are supported in the axial direction to interlock the segment parts 58, 59 against a component 73 disposed on the ramp device 51 (FIG. 13), featuring the limit stops 53 and slots 54. It is obvious that the segment parts can be interlocked also against other components on the pressing plate, or on the ramp device, or on the position sensor 66.

Figure 15:
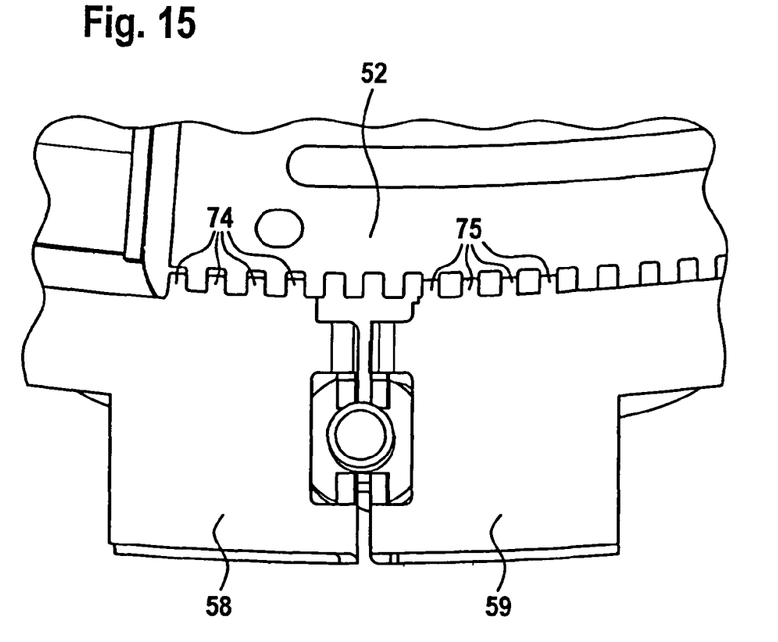
FIG. 15 shows a detail of FIG. 13.

From FIG. 15, it is apparent that the arrangement of the two segment parts 58, 59 in the circumferential direction occurs in a manner that the teeth 74 of the segment part 58 relative to the teeth 75 of the segment part 59 are displaced by half a tooth so that the teeth of a segment part stand on gaps and form the toothed connection with the teeth of the tooth segment 52—and hence the form lock-up between the ramp unit and the pressing plate—and the teeth of the other segment part axially above the tooth segment 52 for a tooth-on-tooth position with the teeth of the tooth segment 52, so long as wear adjustment does not occur.

A description of the wear adjuster of this exemplary embodiment is based on FIGS. 13, 14, and 15. Starting from the setting shown in FIG. 15, the position sensor 66 is deflected so far, in the case of an incorrect spacing from the pressure plate and the pressing plate 49, such that the segment part 58 is lifted from the toothed arrangement and the tooth segment 52 is no longer interlocked. This causes the preload of the energy accumulators 55 to decrease, and the tooth segment is displaced by half a tooth, so that both segment parts 58, 59 come in contact above the tooth segment 52 against the effect of the coil springs 71, 72. During the next opening of the friction clutch, with increasing relief of the ramp device 51, the latter rotates in the direction of rotation D under the effect of energy accumulator 76 that is effective between the ramp device 51 and the pressing plate 49.

Thereby, the tooth segment is rotated further and the segment part 59 snaps in under the effect of the coil spring 72 in the toothed arrangement with the tooth segment 52 under a new formation of a form lock-up, whereas the segment part 58 remains in a tooth-on-tooth position above the tooth segment 52. The next wear adjustment occurs according to the same pattern with reversed segment parts. It should be noted that during the rotation of the ramp device 51 the energy accumulator 55 is preloaded again, in that the limit stop 53 is biased in the circumferential direction. An alternative control of the wear adjustment based on FIGS. 13 to 15 can occur in a manner such that a change of the form lock-up from a position without wear adjustment into a self-adjusted position already occurs upon detection of incorrect spacing by the position sensor 66. Thereby, the positions of the slots 54 are set such that during an axial displacement of one of the parts 58, 59 from the toothed arrangement with the tooth segment 52, the preload of the energy accumulators 55 immediately causes rotation of the tooth segment 52 relative to the tooth segment 57. Through rotation, the part 59, 58 under axial preload, which was not in the toothed arrangement before, snaps in the toothed arrangement with the tooth segment 52 and again forms a form lock-up with the latter, wherein the two tooth segments are in a position rotated by half a tooth relative to one another, and the slots 54 now on their other end are positioned on the pins, and the energy accumulator 55 is stress relieved, or at least nearly relieved. If the friction clutch is now opened and the axial load between the pressing plate 49 and the ramp device 51 is diminished, the latter rotates under the effect of the energy accumulator 76 and against the effect of the energy accumulator 55, thus preloading the latter again. The rotation between pressing plate 49 and ramp device 51 is limited by reaching the limits of the slots 54 by the pins inserted in the ramp device 51. During this rotation, the tooth segments 52, 57 rotate in unison while retaining the form lock-up.

It is obvious that the control limit stops, which in the illustrated exemplary embodiment are formed by the slots 54 in connection with the pins accommodated on the ramp device, can also be provided at another point between the ramp device and a tooth segment assigned to the ramp device 51.

What is claimed is:

1. A friction clutch with a wear adjuster, said clutch comprising: friction linings interposed between a pressure plate and a pressing plate disposed axially relative to each other and axially movable relative to each other in a closing direction of the friction clutch and spring-loaded relative to each other, the pressing plate acted upon by a lever-type loading device such that the plates can be in contacting engagement by movement of the lever-type loading device toward the pressing plate, a position sensor for determining an axial spacing between friction-lining-engaging surfaces of the pressure plate and of the pressing plate when the plates are pressed against the friction linings in a loaded state, a ramp device for compensating for an incorrect spacing of the plates that is detected by the position sensor that is disposed between the ramp device and the pressing plate, whereby the incorrect spacing in the loaded state of the friction linings is determined and in an unloaded state of the friction linings the incorrect spacing is compensated, wherein the ramp device and the pressing plate are connected with one another in a form lock-up that is released when an incorrect spacing is sensed by the position sensor, and wherein the form lock-up between the pressing plate and the ramp device is formed by a toothed connection arrangement including two radially extending and meshing tooth segments, each tooth segment having multiple teeth that extend radially relative to a clutch axis of rotation and that have respective axially-extending engagement surfaces.

2. The friction clutch according to claim 1, wherein the lever-type loading device is a disk spring having disk spring tongues that extend radially inwardly and that bias the pressing plate axially toward the pressure plate and that is supported radially within a component connected non-rotatably with the pressure plate and the pressing plate.

3. The friction clutch according to claim 1, wherein the ramp device is a ramp ring having circumferentially-extending ramps distributed circumferentially, which ramps interact with corresponding counterpart ramps on the pressing plate.

4. The friction clutch according to claim 3, wherein the ramp device is spring-loaded in a circumferential direction.

5. The friction clutch according to claim 1, wherein the form lock-up of the toothed connection arrangement in the presence of an incorrect spacing is released by an axial displacement of the tooth segments, wherein the tooth segments are displaced axially against one another.

6. The friction clutch according to claim 1, wherein one of the tooth segments includes a pair of tooth segments that are associated with the position sensor and the other tooth segment is associated with the ramp device.

7. The friction clutch according to claim 6, wherein the tooth segment associated with the position sensor is spring-loaded in an actuation direction of the friction clutch.

8. The friction clutch according to claim 6, wherein the tooth segment associated with the position sensor is divided in two segment parts and the teeth of the one segment part are circumferentially offset by half a tooth width relative to the teeth of the other segment part.

9. The friction clutch according to claim 1, wherein in the presence of an incorrect spacing a rotation of the ramp device on the pressing plate occurs in a limited manner to reduce the incorrect spacing.

10. The friction clutch according to claim 1, wherein one of the tooth segments is displaceable against the effect of an energy accumulator in a limited manner relative to a corresponding tooth segment in a circumferential direction.

11. The friction clutch according to claim 10, wherein the energy accumulator is a leaf spring interlocked between the pressing plate and a tooth segment.

12. The friction clutch according to claim 10, wherein the energy accumulator is stress relieved by limited displacement of the tooth segment and is preloaded by rotation of the ramp device.

13. The friction clutch according to claim 1, wherein an energy accumulator operatively disposed between the pressing plate and the ramp device is stress relieved during wear adjustment and is again preloaded upon opening the friction clutch.

14. A friction clutch with a wear adjuster, said clutch comprising: friction linings interposed between a pressure plate and a pressing plate disposed axially relative to each other and axially movable relative to each other in a closing direction of the friction clutch and spring-loaded relative to each other, the pressing plate acted upon by a lever-type loading device such that the plates can be in contacting engagement by movement of the lever-type loading device toward the pressing plate, a position sensor for determining an axial spacing between friction-lining-engaging surfaces of the pressure plate and of the pressing plate when the plates are pressed against the friction linings in a loaded state, a ramp device for compensating for an incorrect spacing of the plates that is detected by the position sensor that is disposed between the ramp device and the pressing plate, whereby the incorrect spacing in the loaded state of the friction linings is determined and in an unloaded state of the friction linings the incorrect spacing is compensated, wherein the ramp device and the pressing plate are connected with one another in a form lock-up that is released when an incorrect spacing is sensed by the position sensor, wherein the form lock-up between the pressing plate and the ramp device is formed by a toothed connection arrangement including two meshing tooth segments, wherein one of the tooth segments is associated with the position sensor and the other tooth segment is associated with the ramp device, and wherein the tooth segment associated with the position sensor is divided in two segment parts and the teeth of the one segment part are offset by half a tooth width to the teeth of the other segment part.

* * * * *